June 7, 1966   F. G. THANNHAUSER   3,254,644
THERMOSYPHON SOLAR HEAT CELL
Filed April 27, 1964
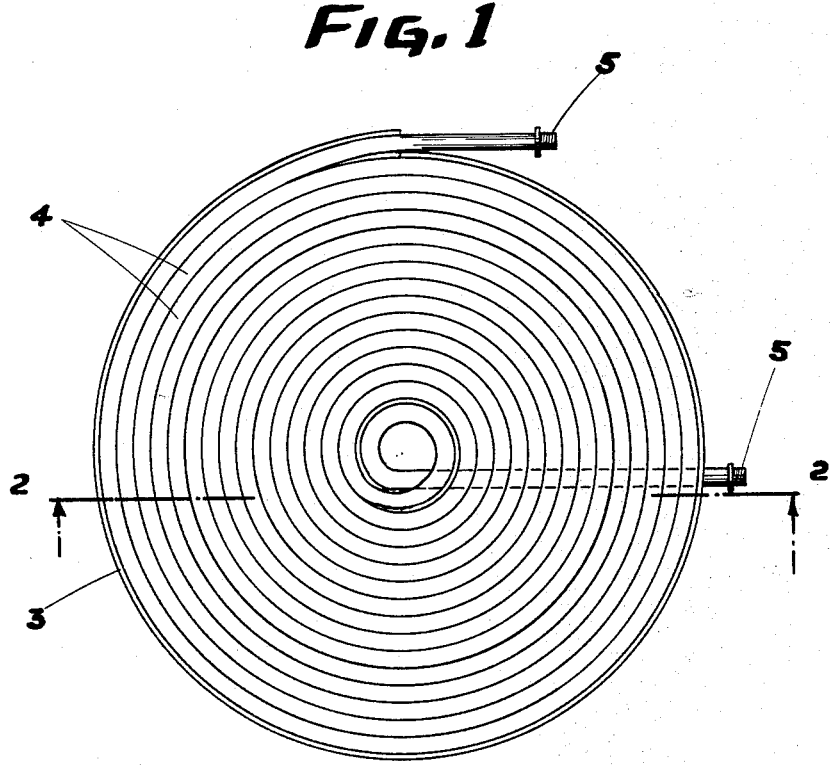
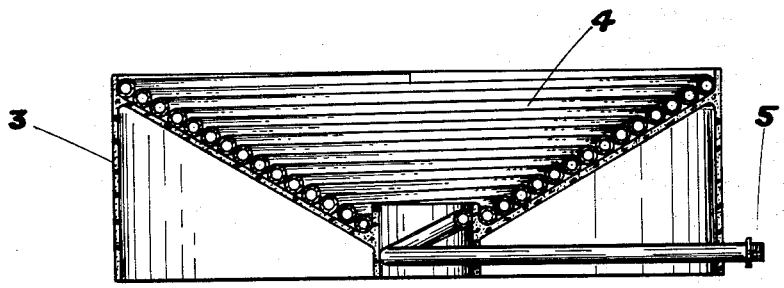
INVENTOR.
FRED G. THANNHAUSER
BY

3,254,644
THERMOSYPHON SOLAR HEAT CELL
Fred G. Thannhauser, Boca Raton, Fla.
(333 N. Ocean Blvd., Deerfield Beach, Fla. 33441)
Filed Apr. 27, 1964, Ser. No. 362,647
2 Claims. (Cl. 126—271)

This invention relates to a thermosyphon solar heat cell. It consists of essentially two (2) parts i.e. a continuous length of hose or tube, with a light absorbing surface, coiled spirally, resting on and supported by a concave surface of revolution.

The hose or tube could be of more than one length joined together by suitable means. When a nonmetallic flexible hose is used with water as the circulating fluid it will stand freezing without damage.

The support can be a one piece structure or consist of many parts suitably joined together. It can be made from a large selection of materials, including plain earth.

When made in a proper configuration it has excellent thermosyphon action and will convert more solar energy to useful heat, from sun up to sun down, than other simple structures in use at the present time.

The purpose of the solar heat cell is to raise the temperature of a liquid or gas without the consumption of fossil fuels and can be used as a heat exchanger.

The initial cost is low, the maintenance cost is low, and the life span is long.

In the drawing:

FIGURE 1 is a plan view of the cell constructed in accordance with this invention.

FIGURE 2 is a vertical sectional view on the line 2—2 of FIGURE 1.

The numeral 4 denotes the hose or tube. The numeral 3 denotes the supporting structure. The numeral 5 denotes suitable fittings on the hose or tube ends for connecting to the source of liquid or gas.

The concave conical surface of the support structure 3 is supported in a fixed position with the surface of revolution axis adapted to pass through the earth's center. The spirally coiled, light absorbing hose or tube 4 rests and is supported by the concave conical surface and is adapted to receive and absorb the sun's rays. The concave conical surface has a configuration which presents at least a portion of the hose or tube light absorbing surface perpendicular or tangent to the sun's rays during the daylight hours. A nonmetallic flexible hose or a metal tube can be used in the solar heat cell.

I claim.

1. A thermosyphon solar heat cell comprising, means forming a concave conical surface of revolution with the said concave conical surface facing upward, a nonmetallic hose with a light absorbing surface, wound spirally, resting on and supported by said concave conical surface, in a fixed position with the surface of a revolution axis adapted to pass through the earth's center, such that the nonmetallic hose is adapted to receive the sun's rays, said concave conical surface having a configuration which presents at least a portion of said light absorbing surface perpendicular or tangent to the sun's rays during the daylight hours.

2. A thermosyphon solar heat cell comprising, means forming a concave conical surface of revolution with the said concave conical surface facing upward, a metal tube with a light absorbing surface, wound spirally, resting on and supported by said concave surface, in a fixed position with the surface of revolution axis adapted to pass through the earth's center, such that the metal tube is adapted to receive the sun's rays, said concave conical surface having a configuration which presents at least a portion of said light absorbing surface perpendicular or tangent to the sun's rays during the daylight hours.

References Cited by the Examiner
UNITED STATES PATENTS

| 1,747,826 | 2/1930 | Gould | 126—271 |
| 2,552,237 | 5/1951 | Trombe | 126—271 |
| 3,039,453 | 6/1962 | Andrassy | 126—271 |

FOREIGN PATENTS

| 379,017 | 2/1909 | France. |
| 942,345 | 9/1948 | France. |

CHARLES J. MYHRE, *Primary Examiner.*

FREDERICK L. MATTESON, *Assistant Examiner.*